United States Patent [19]

Ikemoto et al.

[11] Patent Number: 4,509,381
[45] Date of Patent: Apr. 9, 1985

[54] SPLINED PRESS FIT CONNECTION IN GEAR WHEEL ASSEMBLY

[75] Inventors: Kazuhito Ikemoto; Yukio Terakura; Takashi Miyake; Takashi Yamamoto, all of Toyota, Japan

[73] Assignee: Toyota Jidosha Kabushiki Kaisha, Toyota, Japan

[21] Appl. No.: 450,000

[22] Filed: Dec. 15, 1982

[30] Foreign Application Priority Data

Dec. 26, 1981 [JP] Japan .................. 56-210858

[51] Int. Cl.³ .................. F16H 1/06; F16H 1/20
[52] U.S. Cl. .................. 74/413; 29/159.2; 29/525; 74/421 R; 403/282; 474/903
[58] Field of Search .............. 74/413, 438, 421 R, 74/421 A; 29/159.2, 525; 403/359, 282; 464/179, 180; 474/902, 903

[56] References Cited

U.S. PATENT DOCUMENTS

| | | | |
|---|---|---|---|
| 2,708,246 | 5/1955 | Dunn | 403/359 |
| 3,346,937 | 10/1967 | Folkerts | 29/159.2 |
| 4,376,333 | 3/1983 | Kanamaru et al. | 403/282 |
| 4,416,650 | 11/1983 | Wilkins | 474/161 |

*Primary Examiner*—Leslie A. Braun
*Assistant Examiner*—Shirish Desai
*Attorney, Agent, or Firm*—Oblon, Fisher, Spivak, McClelland & Maier

[57] ABSTRACT

A gear wheel assembly in a gear transmission, in which a gear wheel mounted in position on a shaft is formed at its hub portion with an axial stepped bore, which includes a first inner spline portion of large diameter and a second inner spline portion of small diameter, and the shaft is formed axially in sequence with a cylindrical portion engaged with the second inner spline portion of the gear wheel with a press fit, a first outer spline portion slidably engaged with the first inner spline portion of the gear wheel, and a second outer spline portion engaged with the first inner spline portion of the gear wheel with a press fit.

2 Claims, 7 Drawing Figures

SPLINED PRESS FIT CONNECTION IN GEAR WHEEL ASSEMBLY

BACKGROUND OF THE INVENTION

The present invention relates to a gear wheel assemblying in a change-speed gear transmission for automotive vehicles.

During assemblying of a change-speed gear transmission, a shaft is previously assembled in position within a transmission housing, and thereafter a change-speed driving gear wheel is mounted on the shaft by means of a spline connection to provide a change-speed gear train of the permanent meshing type. In such case, it is required to bring the driving gear wheel into meshing engagement with a driven gear wheel on the other shaft in parallel with the shaft. For this reason, the spline connection is made, in general, as a loose or slidable connection to facilitate the meshing engagement of the driving and driven gear wheels. This results in fretting wear at the spline connection between the driving gear wheel and the shaft.

SUMMARY OF THE INVENTION

It is, therefore, a primary object of the present invention to provide an improved gear wheel assembly in which a gear wheel is mounted in position on a shaft with a press fit by means of a spline connection without any difficulty in its assembly.

According to the present invention, the primary object is accomplished by provision of a gear wheel assembly in a transmission including a shaft rotatably supported in position from a transmission housing, and a gear wheel mounted on the shaft by means of a spline connection, wherein the gear wheel is formed at its hub portion with an axial stepped bore, which includes a first inner spline portion of large diameter and a second inner spline portion of small diameter, and the shaft is formed at its outer circumference with a cylindrical portion engaged with the second inner spline portion of the gear wheel with a press fit, a first outer spline portion slidably engaged with the first inner spline portion of the gear wheel, and a second outer spline portion engaged with the first inner spline portion with a press fit, the cylindrical portion, the first outer spline portion and the second outer spline portion being formed axially in sequence. The gear wheel is mounted on the shaft in such a manner that the first inner spline portion of the gear wheel is loosely engaged with the first outer spline portion of the shaft and fixedly engaged by a press fit with the second outer spline portion of the shaft, and the second inner spline portion of the gear wheel is fixedly engaged by a press fit with the cylindrical portion of the shaft.

BRIEF DESCRIPTION OF THE DRAWINGS

Additional objects and advantages of the present invention will be more readily apparent from the following detailed description of a preferred embodiment thereof when taken together with the accompanying drawings in which.

DETAILED DESCRIPTION OF THE PREFERRED EMBODIMENT

Figure 1:
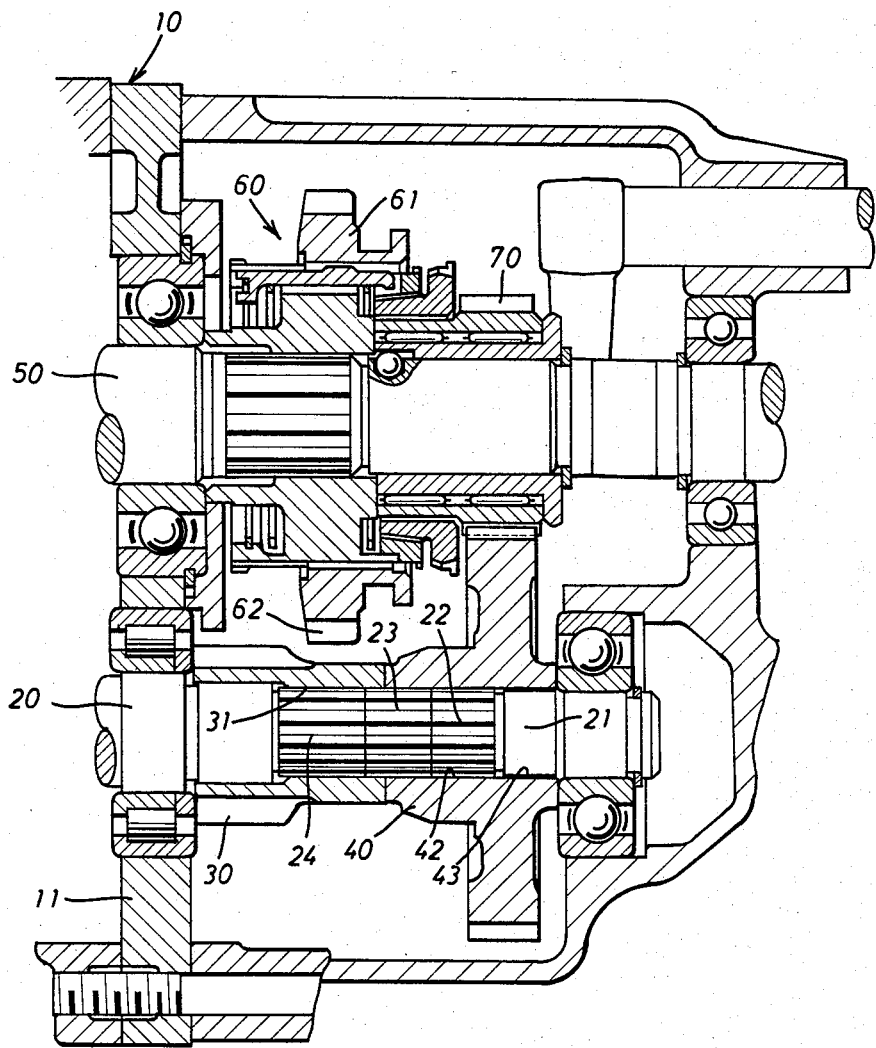
FIG. 1 is a sectional view of a portion of a change-speed gear transmission in which a fifth speed driving gear wheel is mounted on a counter shaft in accordance with the present invention.
Figure 2:
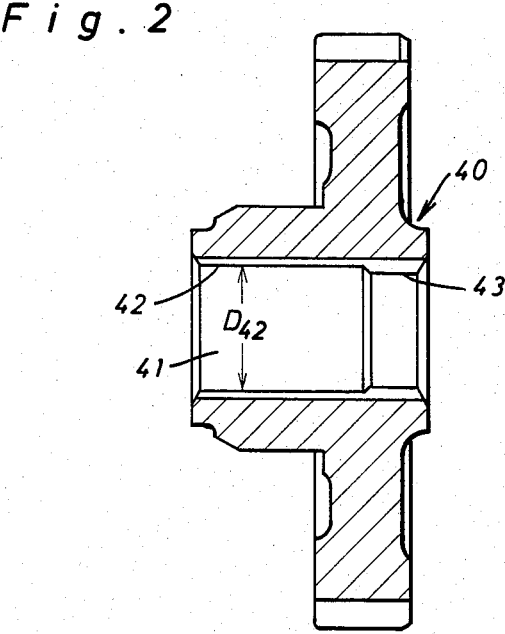
FIG. 2 is an enlarged sectional view of the fifth speed driving gear wheel.

Referring now to the drawings, particularly in FIG. 1, there is illustrated a portion of a change-speed gear transmission for automotive vehicles which includes a countershaft 20 and an output shaft 50 rotatably supported in parallel to each other from a transmission housing assembly 10. A reverse driving gear wheel 30 and a fifth speed driving gear wheel 40 are mounted on the countershaft 20 by means of a spline connection. A synchronizer mechanism 60 for 5-speed and a reverse drive is mounted on the output shaft 50, and also a fifth speed driven gear wheel 70 is rotatably mounted on the output shaft 50 and permanently in meshing engagement with the fifth speed driving gear wheel 40 to provide a fifth speed gear train. The synchronizer mechanism 60 includes a change-over sleeve 61 integral with a reverse driven gear wheel 62 which is arranged to be driven by the reverse driving gear wheel 30 through an idler reverse gear wheel (not shown) to complete a reverse drive gear train of the selective sliding type.

Figure 3:
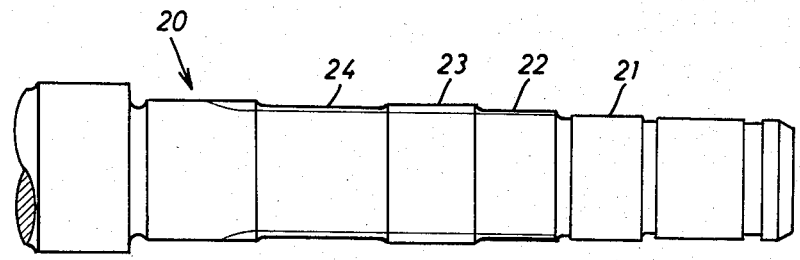
FIG. 3 is an enlarged view of the countershaft.

In such gear arrangement as described above, the fifth speed driving gear wheel 40 is in the form of a helical gear wheel, which is formed at its hub portion with a stepped axial bore 41 including a first inner spline portion 42 of large diameter and a second inner spline portion 43 of small diameter. During the manufacturing process of gear wheel 40, a stepped axial bore is previously prepared in the hub portion of gear wheel 40 and is worked by spline milling to form the first and second inner spline portions 42 and 43. As can be well seen in FIG. 3, the countershaft 20 is formed at its outer circumference with a cylindrical portion 21, a first outer spline portion 22 of small diameter, a second outer spline portion 23 of large diameter, and a third outer spline portion 24 of small diameter, axially in sequence. The cylindrical portion 21 has an outer diameter slightly smaller than the tip circle diameter $D_{42}$ of the first inner spline portion 42 of gear wheel 40, which cylindrical portion 21 is arranged to be fixedly engaged with the second inner spline portion 43 of gear wheel 40 with a press fit. The first outer spline portion 22 of shaft 20 is arranged to be slidably engaged with the first inner spline portion 42 of gear wheel 40, and the second outer spline portion 23 of shaft 20 is arranged to be fixedly engaged at its one end with the first inner spline portion 42 of gear wheel 40 with a press fit and to be slidably engaged at its other end with an axial splined bore 31 of gear wheel 30. The third outer spline portion 24 of shaft 20 is arranged to be slidably engaged with the splined bore 31 of gear wheel 30. During the manufacturing process of countershaft 20, the corresponding stepped portions are previously prepared on shaft 20 and worked by spline milling to form the respective outer spline portions 22, 23 and 24.

Figure 4:
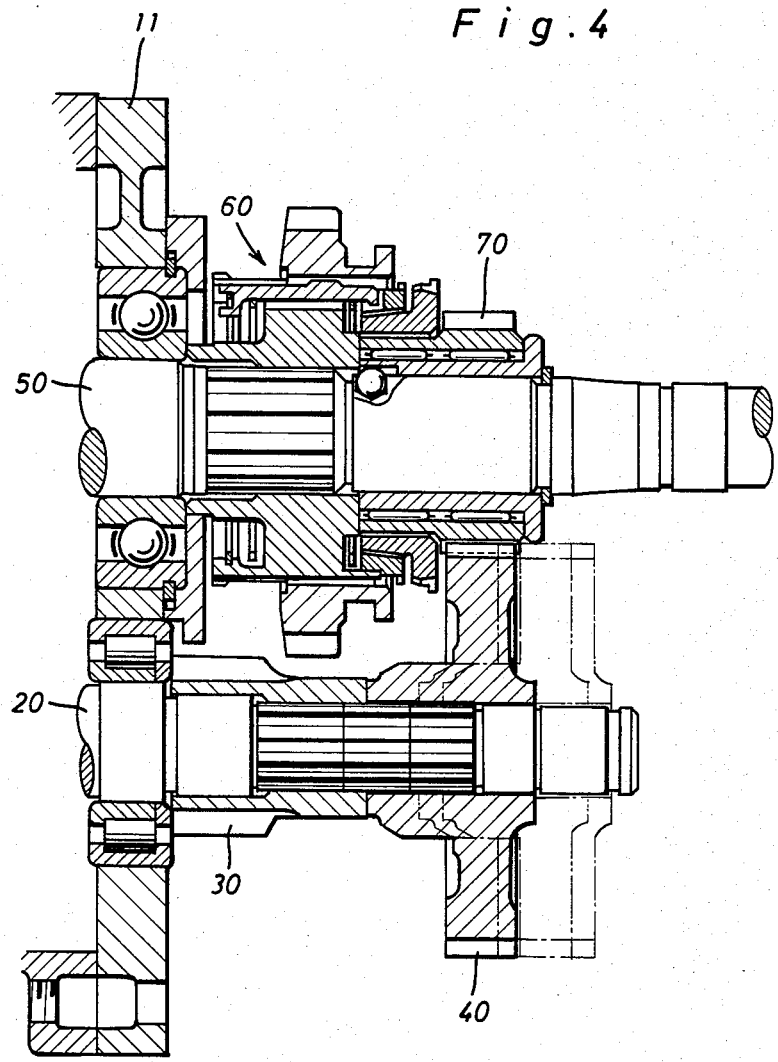
FIG. 4 is a sectional view illustrating the assembling process of the fifth speed driving gear wheel.
Figure 5:
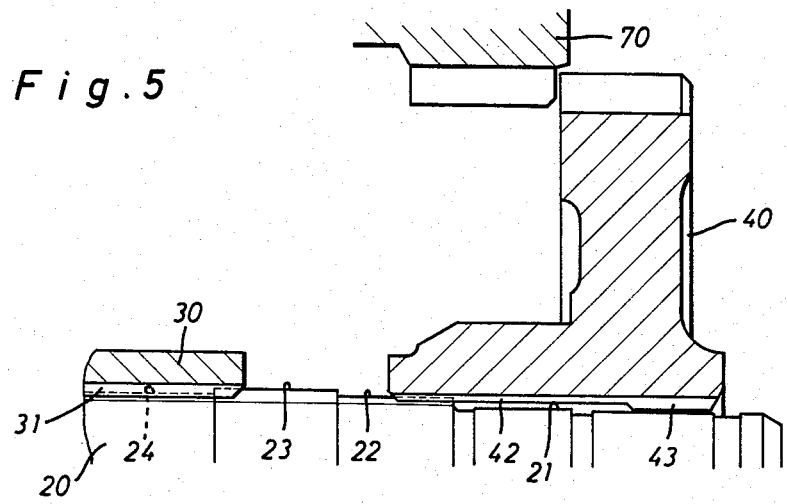
FIGS. 5, 6 and 7 illustrate sucessively assembling steps of the fifth speed driving gear wheel on the countershaft.
Figure 6:
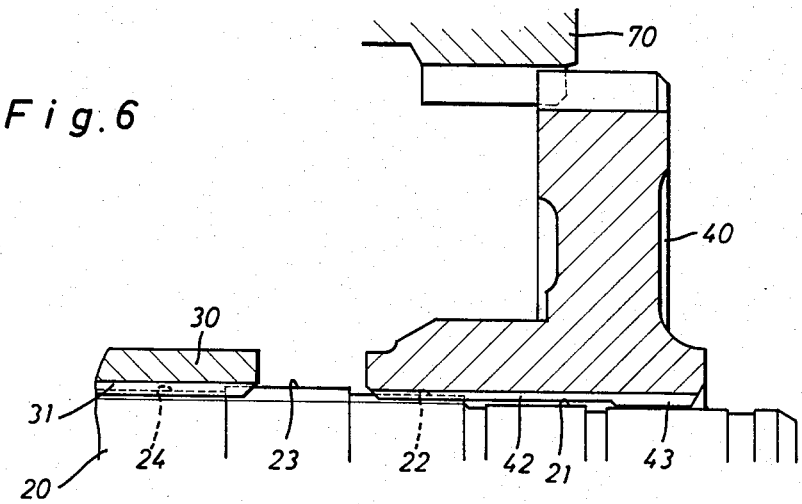
Figure 7:
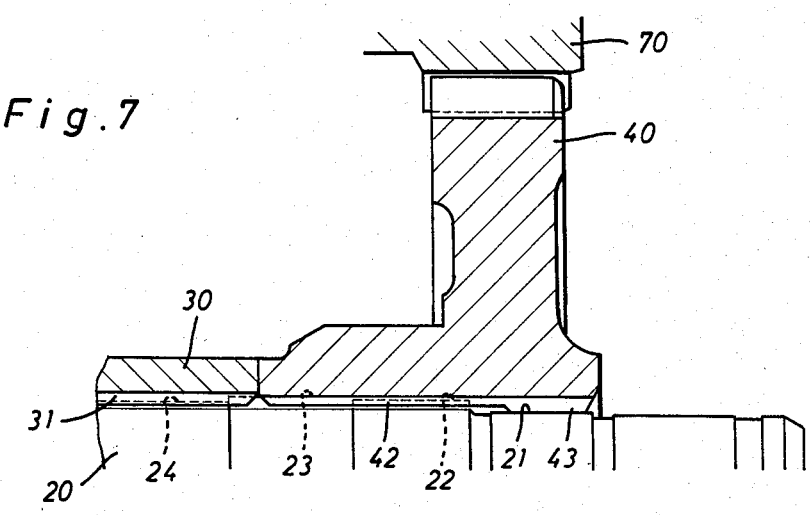

During assembly of the gear transmission, the countershaft 20 and the output shaft 50 are previously mounted on an intermediate plate 11 of the housing assembly 10. Thereafter, the reverse driving gear wheel 30 is mounted in position on countershaft 20, while the synchronizer mechanism 60 and the fifth speed driven gear wheel 70 are mounted in position on output shaft 50. In such assembly, the fifth speed driving gear wheel 40 is mounted at first on the outer end of shaft 20 as is illustrated by a dash and dotted line in FIG. 4, where the first inner spline portion 42 of gear wheel 40 is loosely engaged with the first outer spline portion 22 of shaft 20 as is illustrated in FIG. 5. At this step, either one of the driving and driven gear wheels 40 and 70 is slightly rotated by the operator to be in a position engageable with the other gear wheel. Thereafter, as is illustrated by a dash and double dotted line in FIG. 4, the driving gear wheel 40 is axially inwardly pushed and brought into engagement with a portion of driven gear wheel 70 in such a way as to increase the loose engagement between the first inner spline portion 42 of driving gear wheel 40 and the first outer spline portion 22 of shaft 20 as is illustrated in FIG. 6. At the final step, the driving gear wheel 40 is further pushed inwardly by an appropriate pressure tool and is positioned as illustrated by the solid line in FIG. 4, where the first and second inner spline portions 42 and 43 of gear wheel 40 are fixedly engaged with the second outer spline portion 23 and cylindrical portion 21 of shaft 20 with a press fit respectively as is illustrated in FIG. 7.

From the above description, it will be understood that at the first step the driving gear wheel 40 can be brought into engagement with the driven gear wheel 70 by the operator without any difficulty, and at the final step it is firmly fixed at its opposite ends to countershaft 20 to enhance an anti-fretting wear characteristic at the spline connection.

Having now fully set forth a preferred embodiment of the concept underlying the present invention, various other applications and embodiments as well as certain modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In a gear wheel assembly in a transmission including a shaft rotatably supported in position from a transmission housing, and a gear wheel mounted on said shaft by means of a spline connection, the improvement wherein said gear wheel is formed at its hub portion with an axial stepped bore, which includes a first inner spline portion of large diameter and a second inner spline portion of small diameter, and said shaft is formed at its outer circumference with a cylindrical portion engaged with a cylindrical portion engaged with the second inner spline portion of said gear wheel with a press fit, a first outer spline portion slidably engaged with the first inner spline portion of said gear wheel, and a second outer spline portion engaged with the first inner spline portion of said gear wheel with a press fit, the cylindrical portion, the first outer spline portion and the second outer spline portion being formed axially in sequence, and wherein said gear wheel is mounted on said shaft in such a manner that the first inner spline portion of said gear wheel is loosely engaged with the first outer spline portion of said shaft and fixedly engaged by a press fit with the second outer spline of said shaft, and the second inner spline portion of said gear wheel is fixedly engaged by a press fit with the cylindrical portion of said shaft.

2. A gear wheel assembly as claimed in claim 1, wherein said shaft is in the form of a countershaft arranged in parallel with an output shaft within said transmission housing, and said gear wheel is in the form of a driving gear wheel mounted on said countershaft and in engagement with a driven gear wheel rotatable on said output shaft.

* * * * *